(12) United States Patent
Okabe et al.

(10) Patent No.: US 9,726,134 B2
(45) Date of Patent: Aug. 8, 2017

(54) DEVICE FOR AUTOMATICALLY STOPPING AND RESTARTING INTERNAL COMBUSTION ENGINE

(75) Inventors: Takeru Okabe, Chiyoda-ku (JP); Osamu Ishikawa, Chiyoda-ku (JP); Tomohisa Shoda, Chiyoda-ku (JP); Michitaka Fujiwara, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 318 days.

(21) Appl. No.: 14/371,318

(22) PCT Filed: Apr. 3, 2012

(86) PCT No.: PCT/JP2012/059045
§ 371 (c)(1),
(2), (4) Date: Jul. 9, 2014

(87) PCT Pub. No.: WO2013/150605
PCT Pub. Date: Oct. 10, 2013

(65) Prior Publication Data
US 2014/0345556 A1    Nov. 27, 2014

(51) Int. Cl.
*F02D 29/02* (2006.01)
*F02N 11/08* (2006.01)
*F02N 11/10* (2006.01)

(52) U.S. Cl.
CPC .......... *F02N 11/0814* (2013.01); *F02D 29/02* (2013.01); *F02N 11/0844* (2013.01);
(Continued)

(58) Field of Classification Search
CPC .. F02N 11/08; F02N 11/0803; F02N 11/0814; F02N 11/0818; F02N 11/0822;
(Continued)

(56) References Cited

U.S. PATENT DOCUMENTS 7,275,509 B2 * 10/2007 Kassner .............. F02N 11/0844
123/179.25
7,681,545 B2 * 3/2010 Taki .................... F02N 11/0844
123/179.3
(Continued)

FOREIGN PATENT DOCUMENTS

JP     2003-083146 A     3/2003
JP     4188992 B2        12/2008
(Continued)

OTHER PUBLICATIONS

International Search Report for PCT/JP2012/059045, dated Jun. 12, 2012.

*Primary Examiner* — Sizo Vilakazi
*Assistant Examiner* — Kevin R Steckbauer
(74) *Attorney, Agent, or Firm* — Sughrue Mion, PLLC; Richard C. Turner

(57) ABSTRACT

A device for automatically stopping and restarting an internal combustion engine is provided with a crank angle sensor (1) that detects a crank angle of an engine (10), a fuel injection unit (11) that injects fuel into the engine, and the device is also provided with a starter activation prohibition determination means that prohibits activation of a starter (20) by determining that the engine is in reverse rotation during inertial rotation of the engine, and removes the starter activation prohibition depending on the crank angle when the engine starts reverse rotation.

9 Claims, 11 Drawing Sheets

(52) U.S. Cl.
CPC ...... *F02N 11/101* (2013.01); *F02D 2200/101* (2013.01); *F02N 2200/021* (2013.01); *F02N 2200/022* (2013.01); *F02N 2250/04* (2013.01); *Y02T 10/48* (2013.01)

(58) Field of Classification Search
CPC ............. F02N 11/0825; F02N 11/0829; F02N 11/0833; F02N 11/0844; F02N 11/101; F02N 2250/04
USPC ...................................................... 123/179.4
See application file for complete search history.

(56) References Cited

U.S. PATENT DOCUMENTS

| | | | | |
|---|---|---|---|---|
| 8,091,411 B2* | 1/2012 | Fulks | ............... | F02D 41/009 73/114.26 |
| 8,099,998 B2* | 1/2012 | Muller | ............... | F02D 41/042 73/114.26 |
| 8,171,908 B2* | 5/2012 | Senda | ............... | F02N 11/0844 123/179.4 |
| 8,251,035 B2* | 8/2012 | Hirano | ............... | F02N 11/0844 123/179.28 |
| 8,671,903 B2* | 3/2014 | Notani | ............... | F02N 11/0855 123/179.4 |
| 8,720,401 B2* | 5/2014 | Vogt | ............... | F02N 11/0814 123/179.25 |
| 9,133,776 B2* | 9/2015 | Shimizu | ............... | F02D 13/0238 |
| 9,267,479 B2* | 2/2016 | Kitano | ............... | F02N 11/00 |
| 9,297,445 B2* | 3/2016 | Kees | ............... | F02N 11/006 |
| 9,303,614 B2* | 4/2016 | Shoda | ............... | F02N 11/0833 |
| 2003/0041847 A1 | 3/2003 | Shin | | |
| 2007/0084429 A1* | 4/2007 | Taki | ............... | F02N 11/0844 123/179.4 |
| 2007/0137602 A1* | 6/2007 | Kassner | ............... | F02N 11/0844 123/179.25 |
| 2008/0115753 A1 | 5/2008 | Noguchi | | |
| 2010/0059007 A1* | 3/2010 | Senda | ............... | F02N 11/0844 123/179.4 |
| 2011/0056450 A1* | 3/2011 | Notani | ............... | F02N 11/0844 123/179.4 |
| 2011/0155085 A1* | 6/2011 | Hirano | ............... | F02N 11/0844 123/179.3 |
| 2011/0288752 A1* | 11/2011 | Muller | ............... | F02D 41/042 701/112 |
| 2011/0290010 A1* | 12/2011 | Fulks | ............... | F02D 41/009 73/114.26 |
| 2012/0160202 A1* | 6/2012 | Vogt | ............... | F02N 11/0814 123/179.25 |
| 2012/0303251 A1* | 11/2012 | Shimizu | ............... | F02D 13/0238 701/113 |
| 2014/0107903 A1* | 4/2014 | Kawazu | ............... | F02D 41/0097 701/101 |
| 2014/0326208 A1* | 11/2014 | Shoda | ............... | F02N 11/0833 123/179.4 |
| 2014/0336909 A1* | 11/2014 | Doit | ............... | F02N 11/0855 701/113 |
| 2015/0219060 A1* | 8/2015 | Nakashima | ......... | F02N 11/0818 701/103 |

FOREIGN PATENT DOCUMENTS

| | | | | |
|---|---|---|---|---|
| JP | 2009002202 A | * | 1/2009 | ............ Y02T 10/48 |
| JP | 4228882 B2 | | 2/2009 | |
| JP | 2011-132904 A | | 7/2011 | |
| JP | WO 2013021812 A1 | * | 2/2013 | ......... F02N 11/0844 |

* cited by examiner

DEVICE FOR AUTOMATICALLY STOPPING AND RESTARTING INTERNAL COMBUSTION ENGINE

CROSS REFERENCE TO RELATED APPLICATIONS

This application is a National Stage of International Application No. PCT/JP2012/059045, filed Apr. 3, 2012, the contents of all of which are incorporated herein by reference in their entirety.

TECHNICAL FIELD

The present invention relates to devices for automatically stopping and restarting internal combustion engines, which automatically stop engines when automatically stopping conditions are met and following that, restart the engines when restarting conditions are met.

BACKGROUND ART

In recent years, there has been developed a device for automatically stopping and restarting an internal combustion engine, which, for the purpose of improving fuel consumption of vehicles such as automobiles and reducing environmental burdens, automatically shuts off fuel so as to automatically stop the engine when predetermined conditions to stop the engine by driver operations, such as vehicle speed becoming lower than a predetermined speed and the brake pedal being depressed, are met, and following that, restarts fuel injection and automatically restarts the engine when predetermined conditions to restart the engine by the driver operations, such as releasing the brake pedal and depressing the accelerator pedal, are met.

To date, a device has been proposed, as the foregoing device for automatically stopping and restarting an internal combustion engine, which prohibits cranking by an engine starter, when an engine-reverse-rotation detection and estimation device detects estimates engine reverse rotation, even if the starting conditions are met, thereby preventing an excessive burden from being imposed on the starter and power transmission system and quickly starting up the engine. (See, for example, Patent document 1)

PRIOR ART DOCUMENT

Patent document

Patent document 1: Japanese Patent Publication. No 4228882

DISCLOSURE OF THE INVENTION

Problem to be Solved by the Invention

However, the conventional device disclosed in Patent document 1 predicts reverse rotation to occur during a predetermined period of time after the engine rotation speed becomes lower than a predetermined rotation speed, and in order to suppress an excessive burden being imposed on the starter and power transmission system, starter activation is prohibited for a predetermined period of time. However, the starter activation continues to be prohibited for the predetermined period of time even when the engine reverse rotation speed becomes low and it comes to a state that the excessive burden would not be imposed even if the starter is activated. Therefore, the starter activation is prohibited even when the prohibiting of the starter activation becomes obviously unnecessary, thereby causing a problem in that time of starting start-up is delayed and startability would be deteriorated.

The present invention has been made to solve the problem with the foregoing conventional device, and aims at providing a device for automatically stopping and restarting an internal combustion engine, in which the period of time of prohibiting the starter activation after the engine reverse rotation is shortened, and thereby good startability can be secured.

Means for Solving the Problem

A device for automatically stopping and restarting an internal combustion engine according to the present invention includes a fuel injection unit that injects fuel into an engine; a crank angle sensor that detects a crank angle of the engine and outputs a crank angle signal; a starter having a pinion gear that engages with a ring gear of the engine at start-up and transmits rotation to the ring gear; and an engine control unit that controls the fuel injection unit and the starter; wherein the engine is automatically stopped when automatically stopping conditions are met and following that the engine is restarted when restarting conditions are met. The device for automatically stopping and restarting the internal combustion engine comprises a starter activation prohibition determination means that makes a determination of reverse rotation of the ermine during inertial rotation of the engine, thereby prohibiting activation of the starter, and removes the starter activation prohibition depending on the crank angle when the engine starts reverse rotation.

Advantage of the Invention

According to a device for automatically stopping and restarting an internal combustion engine of the present invention, a determination as to whether or not to remove the prohibition of the starter activation is made depending on the crank angle when the engine starts reverse rotation, after the determination of prohibiting the starter activation, thereby shortening duration of prohibiting the starter activation after the reverse rotation of the engine, so that a device for automatically stopping and restarting an internal combustion engine that has good startabilty can be provided.

The foregoing and other object, features, aspects and advantages of the present invention will become more apparent from the following detailed description of the present invention and the accompanying drawings.

BEST MODE FOR CARRYING OUT THE INVENTION

Embodiment 1

Figure 1:
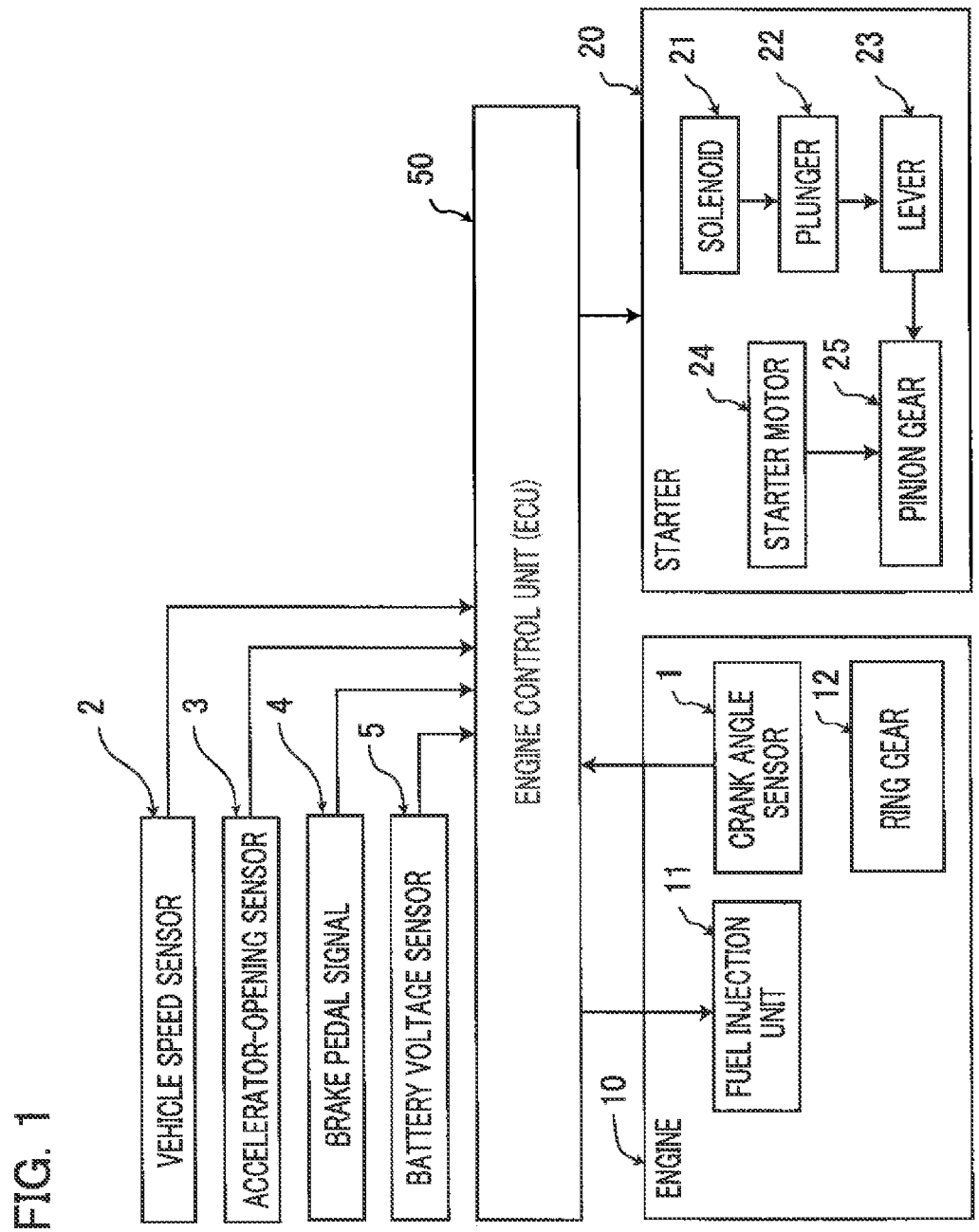
FIG. 1 is a block diagram showing the configuration of a device for automatically stopping and restarting an internal combustion engine according to Embodiment 1 of the present invention.

A device for automatically stopping and restarting an internal combustion engine (hereinafter also referred to as an automatic engine stopping and restarting device) according to Embodiment 1 of the present invention will be explained using FIG. 1 to FIG. 9. Additionally, the same reference numerals represent the same or corresponding parts in each drawing.

FIG. 1 is a block diagram showing the configuration of the automatic engine stopping and restarting device according to Embodiment 1 of the present invention. In FIG. 1, the automatic engine stopping and restarting device according to Embodiment 1 of the present invention includes an engine 10, a starter 20 and an engine control unit 50.

The engine 10 is provided with a fuel injection unit 11, which supplies fuel to the engine 10.

A solenoid 21 is activated following start-up instructions from the engine control unit 50 to the starter 20, and a plunger 22 is thereby attracted. A pinion gear 25 is pushed outward in a rotation axis direction via a lever 23 with the plunger 22 attracted, and contacts and engages with a ring gear 12 provided on the engine crank shaft. Then a contact is closed with the plunger 22 moving and a starter motor 24 is activated, so that the pinion gear 25 rotates.

The engine control unit (ECU: electric control unit) 50 controls the fuel injection unit 11 and also makes a determination of restarting conditions, so as to send the start-up instructions to the starter 20.

Moreover, the engine control unit 50 are connected a crank angle sensor 1 that detects an engine crank angle, a vehicle speed sensor 2 that detects vehicle speed and outputs a vehicle speed signal, an accelerator-opening sensor 3 that outputs a voltage value in accordance with an accelerator opening, a brake pedal signal 4 that outputs a brake signal depending on a pedal-operating state, and a battery voltage sensor 5 that measures the battery voltage.

The engine control unit 50 includes various interface circuits (not shown) and a microcomputer (not shown). Moreover, the microcomputer includes an AD converter (not shown) that converts analog signals, such as detection signals from the foregoing various sensors, into digital signals; a CPU (not shown) that executes various control programs, such as an automatic engine stopping and restarting control program; the automatic engine stopping and restarting control program; a ROM (not shown) that stores the various control programs, control constants, various tables, etc.; and a RAM (not shown) that stores variables etc. when the various control programs are executed.

Figure 2:
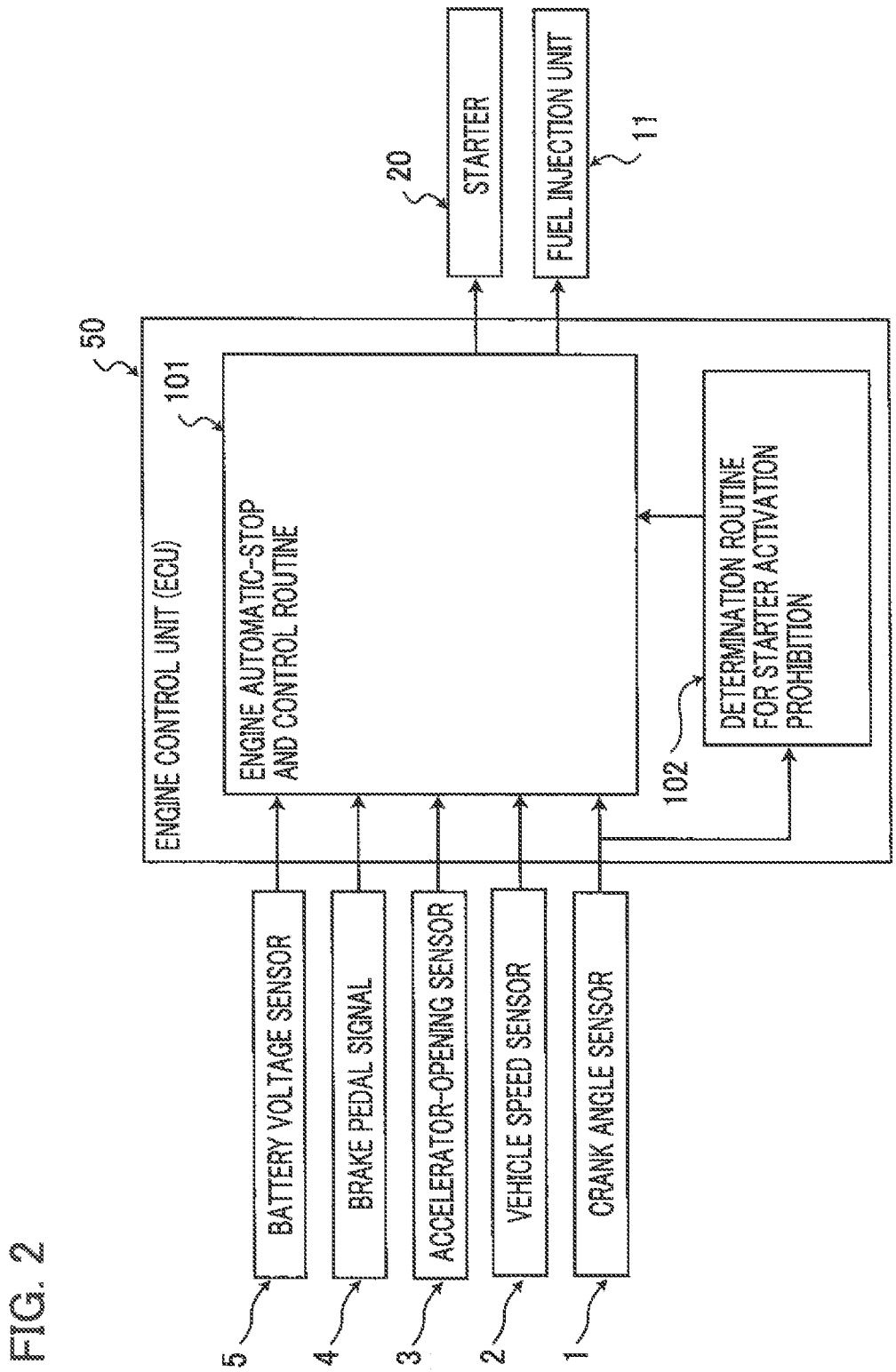
FIG. 2 is a control block diagram of the device for automatically stopping and restarting an internal combustion engine according to Embodiment 1 of the present invention.

FIG. 2 is a control block diagram of the automatic engine stopping and restarting device according to Embodiment 1 of the present invention, which shows configurations of various processing routines.

In FIG. 2, an engine automatic-stop and control routine 101 provided in the engine control unit 50 firstly makes a determination as to whether or not to automatically stop the engine, using information from the vehicle speed sensor 2, the accelerator-opening sensor 3, the brake pedal signal 4, etc., and then stops the fuel injection unit 11.

The engine automatic-stop and control routine 101 indicates by the automatic stop flag F1 whether or not an automatic stop request is present based on the determination of automatically stopping the engine.

Next, when making a determination that the engine-restarting conditions are met, using the information from the accelerator-opening sensor 3, the brake pedal signal 4, etc., the engine automatic-stop and control routine 101 activates and controls starter 20 based on the start-up instructions, so as to restart the engine.

At this moment, when the starter 20 is activated, the plunger 22 in the starter 20 is attracted with the solenoid 21 activated, the pinion gear 25 is pushed outward via the lever 23 in the rotation axis direction, and contacts and engages with the ring gear 12 provided on the engine crank shaft. Then, the contact is closed with the plunger 22 moving and the starter motor 24 is activated, so that the pinion gear 25 rotates.

Next, a determination routine for starter activation prohibition 102 makes a determination as to whether or not to prohibit starter activation, using crank angle information obtained from the crank angle sensor 1 and engine rotation speed.

Figure 3:
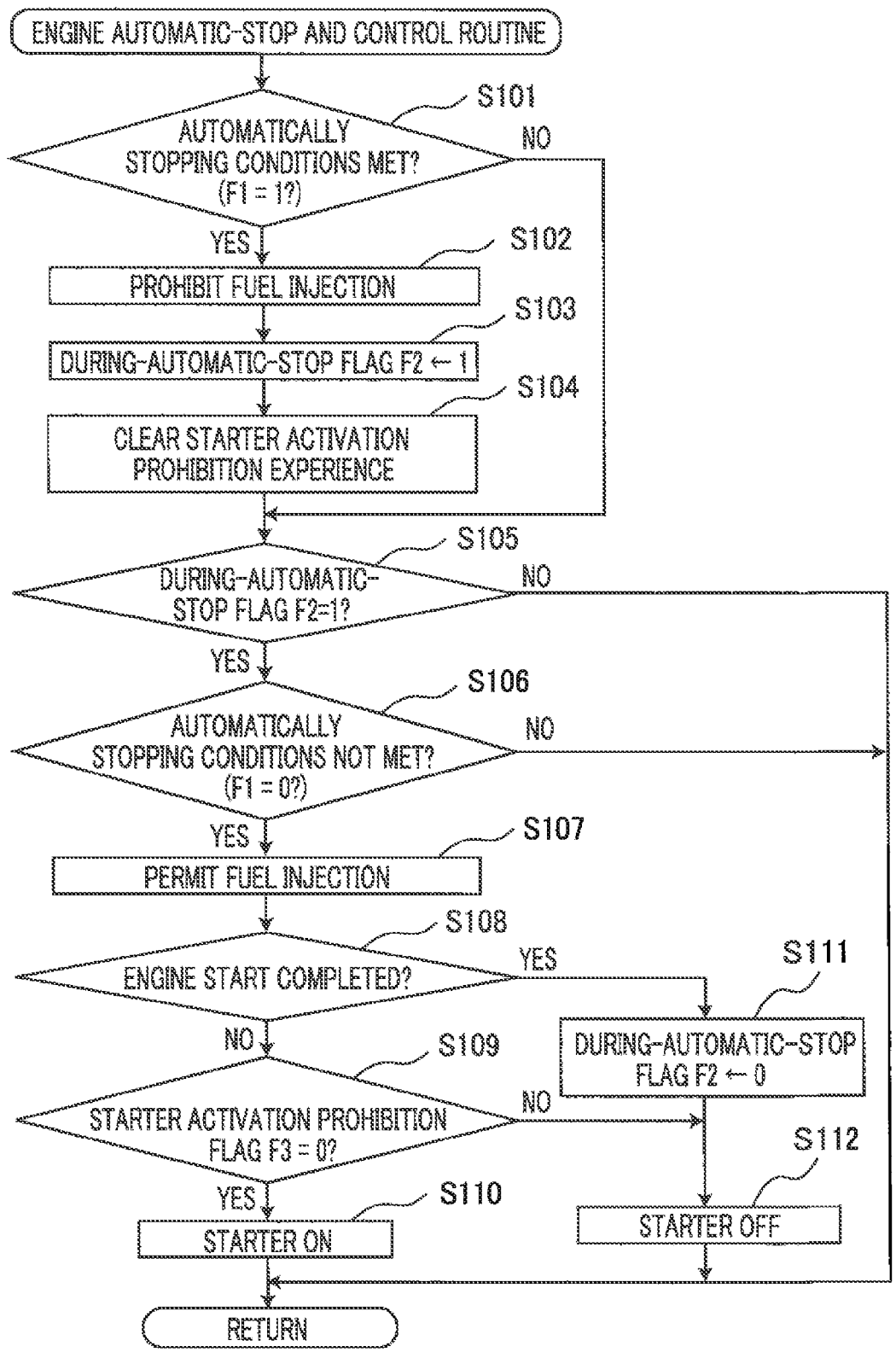
FIG. 3 is a flowchart of engine automatic-stop and control in the device for automatically stopping and restarting an internal combustion engine according to Embodiment 1 of the present invention.

The automatic-stop and control routine will be explained next referring to the flowchart in FIG. 3. This control routine is executed at regular time intervals, such as every 1 ms.

First of all, a determination is made as to whether or not the automatically stopping conditions are met in Step S101. When the automatically stopping conditions are not met, the process goes to NO and S105 ensues. On the contrary when the automatically stopping conditions are met, the process goes to YES and fuel injection is prohibited in S102.

Next in Step S103, 1 is substituted in the during-automatic-stop flag 12, and starter activation prohibition experience is cleared in Step S104.

Next, a determination is made in Step S105 as to whether or not the during-automatic-stop flag F2 is raised.

In Step S105, when the during-automatic-stop flag F2 is not raised, that is, when F2=0, the process goes to NO and the automatic-stop and control routine is completed; whereas, when the during-automatic-stop flag F2 is raised, that is, when F2=1, the process goes to YES and the next step is executed.

Next, a determination is made in Step S106 as to whether or not the automatically stopping conditions are met. When the automatically stopping conditions are met, that is, when F1=1, the process goes to NO and the engine automatic-stop and control routine is completed; whereas, when the automatically stopping conditions are not met, that is, when F1=0, the process goes to YES, Step S107 is executed, and the fuel injection is permitted.

Next, it is determined in Step S108 whether or not starting up the engine has been completed. When starting up the engine has been completed, the process goes to YES, and the during-automatic-stop flag F2 is cleared in Step S111, that is, 0 is substituted in F2. Then, the starter is deactivated in Step S112, and the engine matic-stop and control routine is completed.

When a determination is made in Step S108 that starting the engine has not been completed, the process goes to NO, Step S109 is executed, and the starter activation prohibition flag is checked. The completion of starting up the engine is determined here based on whether or not the engine rotation speed exceeds a predetermined rotation speed.

This predetermined rotation speed is set to 800 rpm, for example; however, this setting value sometimes changes depending on engines and vehicles mounted with the engines. Moreover, the engine rotation speed used for the determination is computed by the engine control unit 50 based on a signal from the crank angle sensor shown in FIG. 2.

Next, when a determination is made in Step S109 that the starter activation prohibition flag F3 is raised, that is, when F3=1, the process goes to NO, the starter is deactivated in Step S112, and the engine automatic-stop and control routine is completed. Whereas, when a determination is made that the starter activation prohibition flag F3 is not raised, that is, when F3=0, the process goes to YES, the starter is activated in Step S110, and the engine automatic-stop and control routine is completed.

The determination routine for starter activation prohibition will be explained next referring to the flowchart in FIG. 4A and FIG. 4B. This determination routine is executed at regular time intervals, such as every 1 ms.

First all, a determination is made as to whether or not the starter activation prohibition experience is set (Step S201). When the starter activation prohibition experience is set, the process goes to YES and the process of Step S205 is executed. Whereas, when the starter activation prohibition experience is cleared, the process goes to NO and a determination is made as to whether or not the engine rotation speed is lower than a predetermined value (Step S202). When the engine rotation speed Ne is not lower than a predetermined value Ne_th2 in Step S202, the process goes to NO and the process of Step S205 is executed. Whereas, when the engine rotation speed Ne is lower than the predetermined value Ne_th2, the process goes to YES and the starter activation prohibition experience is set (Step S203). Here, Ne_th2 is set to 30 to 40 rpm. In addition, it may be set to not a constant value but to a value that varies depending on the crank angle, for example.

Following that, the starter activation prohibition flag F3 is set, that is, 1 is substituted in F3 and Step 205 ensues. Newt in Step S205, the present value F4(n) is substituted in F4(n−1) that is the immediately preceding RAM value of the forward and reverse rotation determination flag F4, and Step S206 ensues.

In Step S206, a determination is made as to whether or not a reverse rotation pulse is detected. When the reverse rotation pulse is not detected, the process goes to NO, 0 is substituted in F4 (n) that is the present value of the forward and reverse rotation determination flag F4 (Step S207), and the determination routine for starter activation prohibition is completed.

Whereas, when the reverse rotation pulse is detected, the process goes to YES, 1 is substituted in F4(n) that is the present value of the forward and reverse rotation determination flag F4 (Step S208), and Step S209 ensues.

Next, a determination is made in Step S2.09 as to whether or not the forward and reverse rotation determination flag F4 is switched from forward rotation to reverse rotation. Specifically, a determination is made as to whether or not the immediately preceding value of the forward and reverse rotation determination flag F4 is 0 and the present value thereof is 1. When the forward and reverse rotation determination flag F4 is switched from the forward rotation to reverse rotation, that is, when the determination result in Step S209 is true, the process goes to YES, the present crank angle is substituted in Crk that is the crank angle determination RAN (Step S210) and Step S211 ensues. Whereas, when the determination result in Step S209 is false, the process goes to NO and Step S211 ensues.

In Step S211, a determination is made as to whether or not the crank angle Crk when forward rotation is switched to reverse rotation is within a predetermined range. When the crank angle Crk is within the predetermined range, the process goes to YES and Step S213 ensues. Whereas, when the crank angle Crk is outside the predetermined range, the process goes to NO, the starter activation prohibition flag F3 is cleared, that is, 0 is substituted in F3 (Step S212) and Step S213 ensues. Here, the predetermined range is set between Crk_low (70° BTDC) and Crk_high (0° BTDC). Additionally, this setting value can take different values depending on engines and vehicles mounted with the engines.

In Step S213, a determination is made as to whether or not the engine rotation speed Ne is detected as a minimum value. When the engine rotation speed Ne is not detected as the minimum value, the process goes to NO, and the determination routine for starter activation prohibition is completed. Whereas, when the engine rotation speed Ne is detected as the minimum value, the process goes to YES, and a determination is made as to whether or not the engine rotation speed is higher than a predetermined value (Ne_th3×Kα×Kβ, Step S214). Here, the predetermined value Ne_th3 is set to a value of some −100 rpm, and Kα takes a value depending on the gap width between the pinion gear and ring gear. In addition, Kβ takes a value depending on the battery voltage. When the engine rotation speed Ne is lower than Ne_th3, the process goes to NO, and the determination routine for starter activation prohibition is completed. Whereas, when the engine rotation speed Ne is higher than Ne_th3, the process goes to YES, the starter activation prohibition flag F3 is cleared, that is, 0 is substituted in F3 (Step S215), and the determination routine for starter activation prohibition is completed.

Moreover, a method of detecting the minimum value of the engine rotation speed Ne is as follows: the immediately preceding value of the engine rotation speed Ne is compared with the present value thereof, and if the present value increases compared to the immediately preceding value, the immediately preceding value just has to be taken as the minimum value.

Descending behavior of the engine rotation speed and a range allowing starter shift will be explained using the timing chart in FIG.

The relation between the engine rotation speed and the flag A will be explained. Firstly, suppose that a pinion gear (starter side gear) is made to shift into a rotating ring gear (engine side gear) in a shift-type starter. There exists a rotation speed range that allows the pinion gear to shift. When the engine rotation speed is descending, the rotation speed overshoots 0 rpm by the effect of the engine inertia and then stops after reverse rotation. In the course of the engine stopping, if the rotation speed is in the range of lower than Ne_st_h that is an upper limit of the rotation speed allowing the shift and higher than Ne_st_l that is a lower limit of the rotation speed Ne_st_l allowing the shift (the range indicated by hatching in FIG. 5), the gear is enabled to shift.

Here, in general, Ne_st_h that is the upper limit of the rotation speed allowing the starter shift is some 70 rpm; Ne_st_l that is the lower limit of the rotation speed allowing the starter shift is some −50 rpm.

If shown by a flag, this becomes as shown by the flag A: the status is switched to "shift allowed" from "shift not allowed" at time t_52, and switched to "shift not allowed" from "shift allowed" at time t_54 Then, the status is again switched to "shift allowed" from "shift not allowed" at time t_56.

Figure 5:
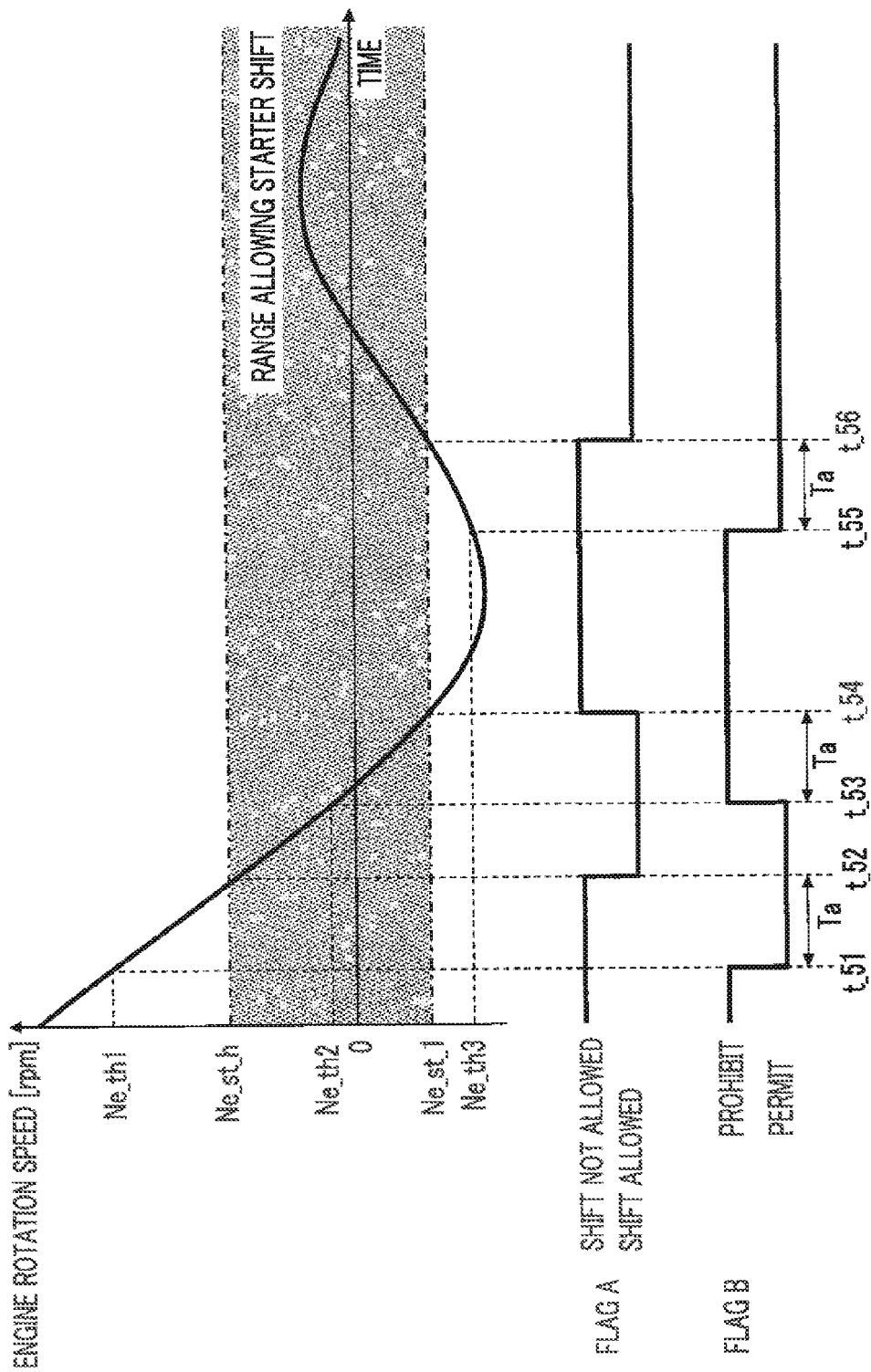
FIG. 5 is a timing chart showing descending behavior of engine rotation speed and a range allowing starter shift in Embodiment 1 of the present invention.

Moreover in the case of the shift-type starter, a gap of some 3±1 mm is provided between the pinion gear and ring gear, so there is a time difference Ta from the time of a starter instruction signal being turned into "activate" to the time of the pinion gear and ring gear contacting each other. The time difference Ta for the starter to make contact is generally 30 to 50 ms; however due to the presence of this time difference Ta, the timing of prohibiting the starter activation and that of permitting the activation shift leftward, as shown by the flag B, by the time Ta with respect to the flag A. Therefore, the status is switched at t_51, as shown in FIG. 5, from "the starter activation prohibited" to "the starter activation permitted." The engine rotation speed Ne_th1 at this moment becomes a threshold value in making a determination of permitting the starter activation.

Similarly, the status is switched at t_53 from "the starter activation permitted" to "the starter activation prohibited," and the engine rotation speed Ne_th2 at this moment becomes a threshold value in making a determination of prohibiting the starter activation. Similarly, the status is switched at t_55 from "the starter activation prohibited" to "the starter activation permitted." The engine rotation speed Ne_th3 at this moment becomes a threshold value in making the determination of permitting the starter activation.

In an actual control program, the determination threshold values Ne_th1, Ne_th2 and Ne_th3 each are compared with engine rotation speed, thereby making a determination of "the starter activation prohibited" or "the starter activation permitted."

Figure 6:
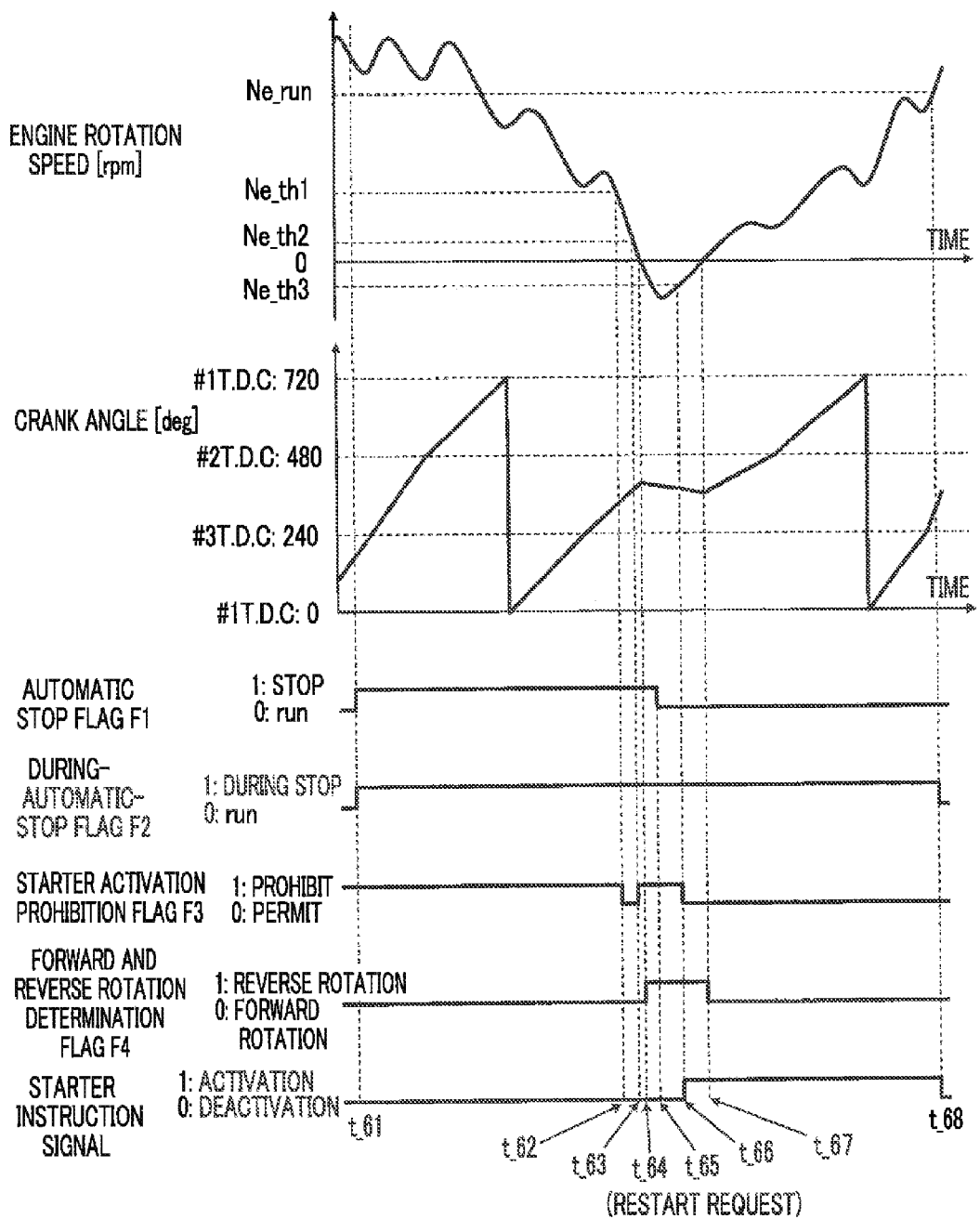
FIG. 6 is a timing chart showing automatic stop and restart in Embodiment 1 of the present invention.

Next, each flag used for control and behavior of the starter instruction signal will be explained using FIG. 6. An operation in a three-cylinder engine will explained in this Embodiment 1.

Behavior of the crank angle is such that the angle increases during forward rotation and decreases during reverse rotation. Since the reverse rotation begins at t_64 in the timing chart in FIG. 6, the crank angle changes to decreasing from increasing; since the rotation changes from reverse rotation to forward rotation at t_67, the crank angle changes from decreasing to increasing.

The automatic stop flag F1 will be explained. Idling-stop determination conditions, such as brake being on, are met at t_61, and the automatic stop flag F1 is switched to "stop: F1=1."

With this flag raised, fuel injection is interrupted (not shown), and the engine rotation speed thereby starts descending. Idling-stop removal conditions, such as brake being off, are met next at t_65 (not shown), and the automatic stop flag F1 is switched to "run: F1=0."

Next, the operation of the during-automatic-stop flag F2 will be explained. The during-automatic-stop flag F2 is switched to "during stop: F2=1" at the same time as the idling-stop determination conditions, such as brake being on, are met at time t_61 and the automatic stop flag F1 is switched to "stop: F1=1." Then, F2 is switched to "run: F2=0" at time t_68 that is the timing of making a determination that the engine has started up. In this Embodiment 1, the determination that the engine start-up is completed is made by engine rotation speed Ne exceeding a predetermined value (Ne_run).

The operation of the starter activation prohibition flag F3 will be explained next. This flag is a flag that is set when a determination is made that the starter activation is difficult, such as engine rotation speed being high. The engine rotation speed is higher than Ne_th1 until time t_62, and which is in a region of the pinion gear incapable of engaging even if the starter is activated; therefore, F3 is made "prohibit: F3=1." The period between time t_62 and time t_63 is a region of the pinion gear capable of engaging; therefore, F3 is made "permit: F3=0." Following that, the period between time t_63 and time t_66 is a region where reverse rotation is deep; therefore, F3 is made "prohibit: F3=1." Then after time t_66, the pinion gear is capable of engaging; therefore, F3 is made "permit: F3=0."

Next, the operation of the forward and reverse rotation determination flag F4 will be explained. Since the engine is in forward rotation for the period until time t_64, F4 is "forward rotation: F4=0," since it is in reverse rotation between time t_64 and time t_67, F4 is "reverse rotation: F4=1," and since it is in forward rotation after time t_67, F4 is "forward rotation: F4=0."

Here, the determination as to whether the engine is in forward rotation or reverse rotation may be made using output from a sensor capable of detecting reverse rotation. Moreover, the period of reverse rotation may be predicted from the inclination and the like of the engine rotation speed Ne.

Lastly, the operation of the starter instruction signal will be explained. This signal is set and cleared by the engine automatic-stop and control routine in FIG. 3.

Idling-stop removal conditions, such as brake being off, are met at time t_65 (not shown), and the automatic stop flag F1 is switched to "run: F1=0." However, since the starter activation prohibition flag F3 is "prohibit: F3=1," the starter instruction signal remains "stop: 0." Then, the starter activation prohibition flag F3 is switched from "prohibit: F3=1" to "permit: F3=0;" therefore, the starter instruction signal is switched to "activate: 1," and cranking starts. Then, the engine rotation speed Me exceeds the predetermined value (Ne_run), whereby a determination is made that start-up has been completed, and the starter instruction signal is switched to "stop: 0,"

Figure 7:
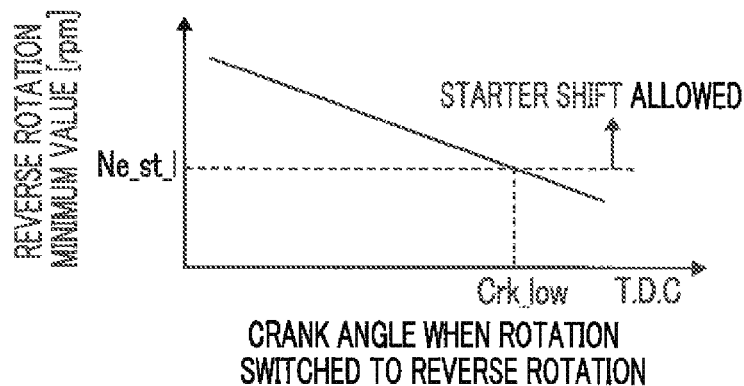
FIG. 7 is a characteristic diagram of a minimum value of reverse rotation with respect to a crank angle when forward rotation is switched to reverse rotation in Embodiment 1 of the present invention.

In FIG. 7 is shown the relation between the crank angle when engine rotation speed is switched to reverse rotation from forward rotation and the minimum value of the reverse rotation when the rotation behaving in that way. As shown in FIG. 7, the closer the crank angle when the rotation is switched to reverse rotation is to the top dead center (T.D.C), the more the minimum value of the reverse rotation tends to be small, that is, the deeper the reverse rotation tends to become. The determination value Crk_low shown in FIG. 7 becomes a constant applied to the control logic shown by the flowchart in FIG. 4A and FIG. 4B, and the specific value of which is set to some 70° BTDC.

Figure 8:
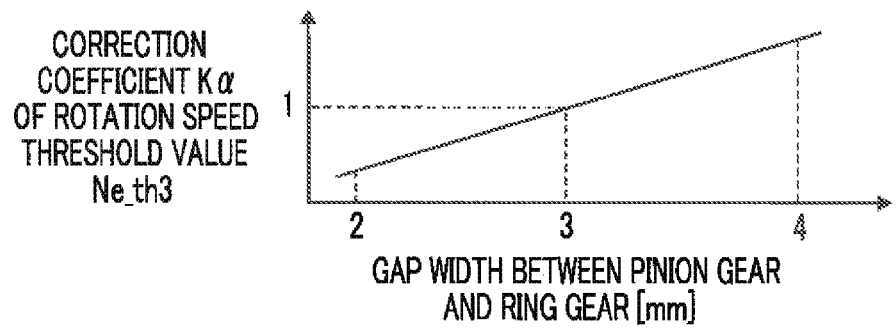
FIG. 8 is a diagram showing the relation of a coefficient for correcting rotation speed to remove starter activation prohibition with respect to the gap width between a pinion gear and ring gear in Embodiment 1 of the present invention.

FIG. 8 shows the relation of the correction coefficient Kα of the rotation speed to remove the starter activation prohibition with respect to the gap width between the pinion gear 25 and ring gear 12. When the gap is wider than 3 mm that is its center value, since time required for the pinion gear 25 to contact the ring gear 12 becomes longer, the optimum value of Ne_th3 needs to be decreased. Therefore, the correction coefficient Kα becomes greater than 1. Whereas, when the gap is narrower than 3 mm that is the center value, the time required for the ring gear 12 and pinion gear 25 to contact each other becomes shorter, so the optimum value of Ne_th3 needs to be increased. Therefore, the correction coefficient Kα becomes smaller than 1.

Figure 9:
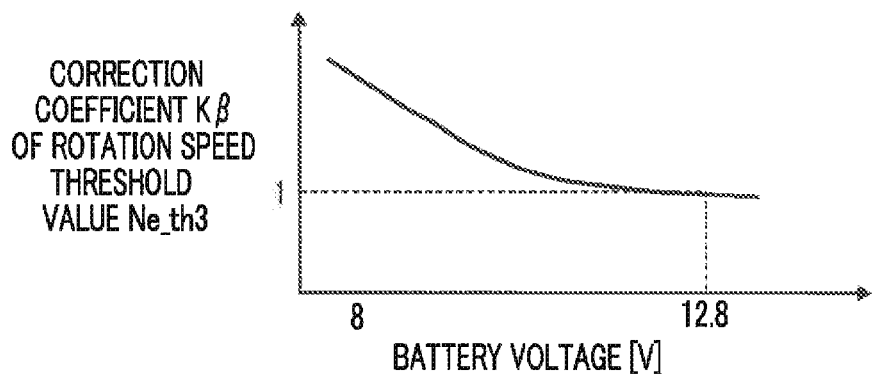
FIG. 9 is a diagram showing the relation of a coefficient for correcting rotation speed for removing the starter activation prohibition with respect to battery voltage in Embodiment 1 of the present invention.

Here, it is preferable that the gap between the pinion gear 25 and ring gear 12 be measured at shipping at factories and others, so as to decide Kα, and the result be stored in the RAM (not shown) of the engine control unit FIG. 9 shows the relation of the correction coefficient Kβ of the rotation speed to remove the starter activation prohibition with respect to the battery voltage. When the battery voltage is low, since voltage applied to the plunger 22 shown in FIG. 1 becomes low, attraction force the plunger 22 generates becomes weak. Therefore, the time required for the pinion gear 25 to contact the ring gear 12 becomes longer. Therefore, when the battery voltage becomes low, the optimum value of the Ne_th3 needs to be decreased. If the correction coefficient is set to 1 here when the battery voltage is 12.8 V, the correction coefficient will be set to increase as the battery voltage decreases. Then, this data is preferably stored as a map in the ROM (not shown) of the engine control unit 50. Moreover, the battery voltage used for the determination is preferably made, for example, a battery voltage when reverse rotation is detected.

As described above, an automatic engine stopping and restarting device according to Embodiment 1 of the present invention includes a starter activation prohibition determination means that makes a determination of engine reverse rotation during inertial rotation of the engine, thereby prohibiting starter activation, and removes the starter activation prohibition depending on the crank angle when the engine starts reverse rotation.

Therefore, since the starter activation prohibition can be removed in a region where the prohibition of the starter activation is unnecessary, the starter can be activated quickly in response to a restart request. Therefore, time spent from the restart request to the start-up completion becomes shorter, so that discomfort will not be caused to drivers.

Moreover, the automatic engine stopping and restarting device is made to remove the activation prohibition at the timing of the engine rotation speed becoming a predetermined tolerable rotation speed after a maximum rotation speed has been detected during engine reverse rotation.

Therefore, the activation prohibition can be quickly removed in the course of the engine rotation speed coming close to 0 rpm, and the time spent from the restart request to the start-up completion is shortened, so that discomfort will not be caused to drivers.

Furthermore, since the automatic engine stopping and restarting device is made such that the engine rotation speed determination value used for the determination of removing the activation prohibition is obtained from the gap width between the pinion gear and ring gear and the battery voltage, an optimum determination can be made about removing the activation prohibition at all times, even if the starter operation characteristics change attributed to difference in individual engines, aging of the battery, and so forth.

Therefore, the time spent from the restart request to the start-up completion can be shortened, so that discomfort will not be caused to drivers.

Embodiment 2

An automatic engine stopping and restarting device according to Embodiment 2 of the present invention will be explained using FIG. 10, FIG. 11A and FIG. 11B.

In Embodiment 2, learning correction of the determination value Crk_low will be explained, which is used for the determination of clearing the starter activation prohibition flag F3 in the determination routine for starter activation prohibition in FIG. 4A and FIG. 4B.

The configuration and control block of the automatic engine stopping and restarting device according to Embodiment 2 are the same as those of Embodiment 1, so their explanation will be omitted. In addition, the timing chart showing engine automatic-stop and control, starter activation prohibition determination, and automatic stop and restart is also the same as that of Embodiment 1, so its explanation will also be omitted.

Figure 10:
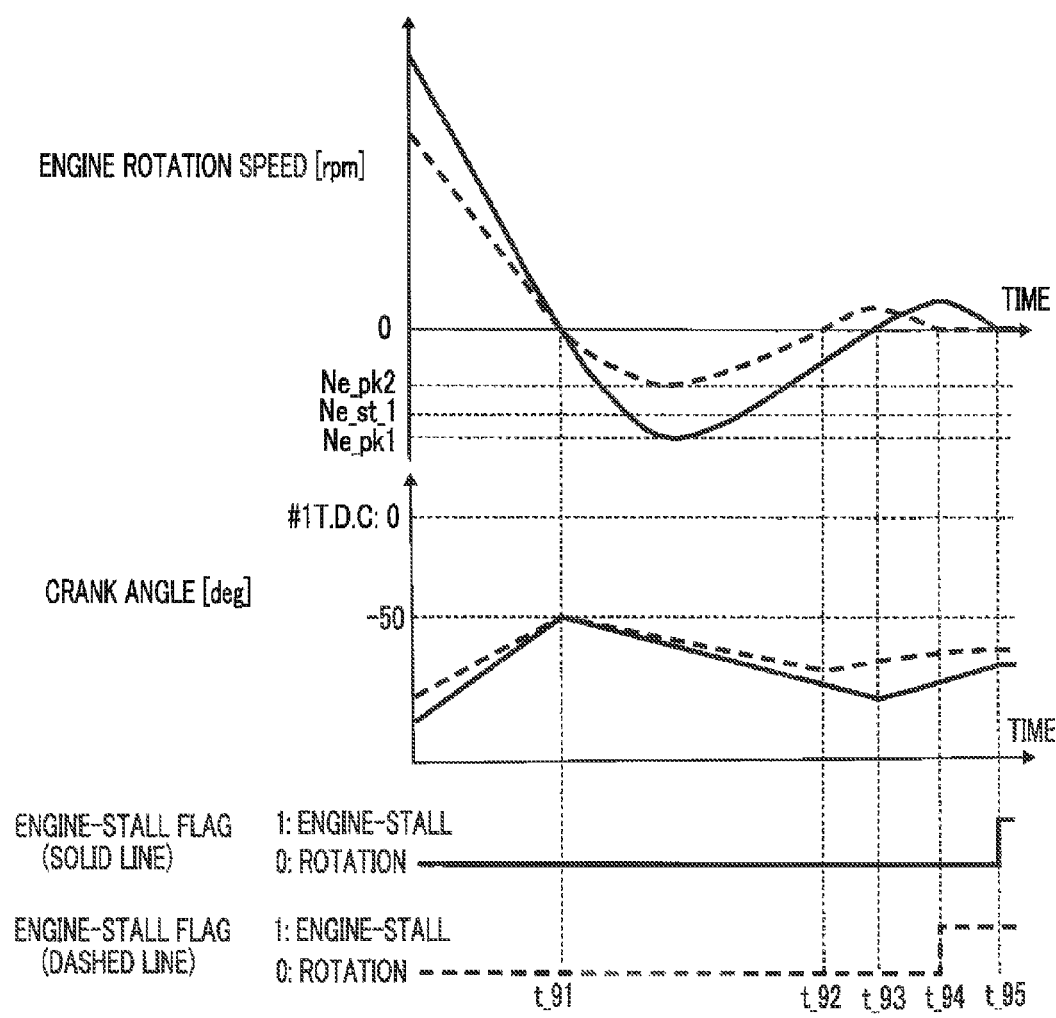
FIG. 10 is a time-series waveform diagram of engine-stopping behavior and a crank angle in a device for automatically stopping and restarting an internal combustion engine according to Embodiment 2 of the present invention.
Figure 11A:
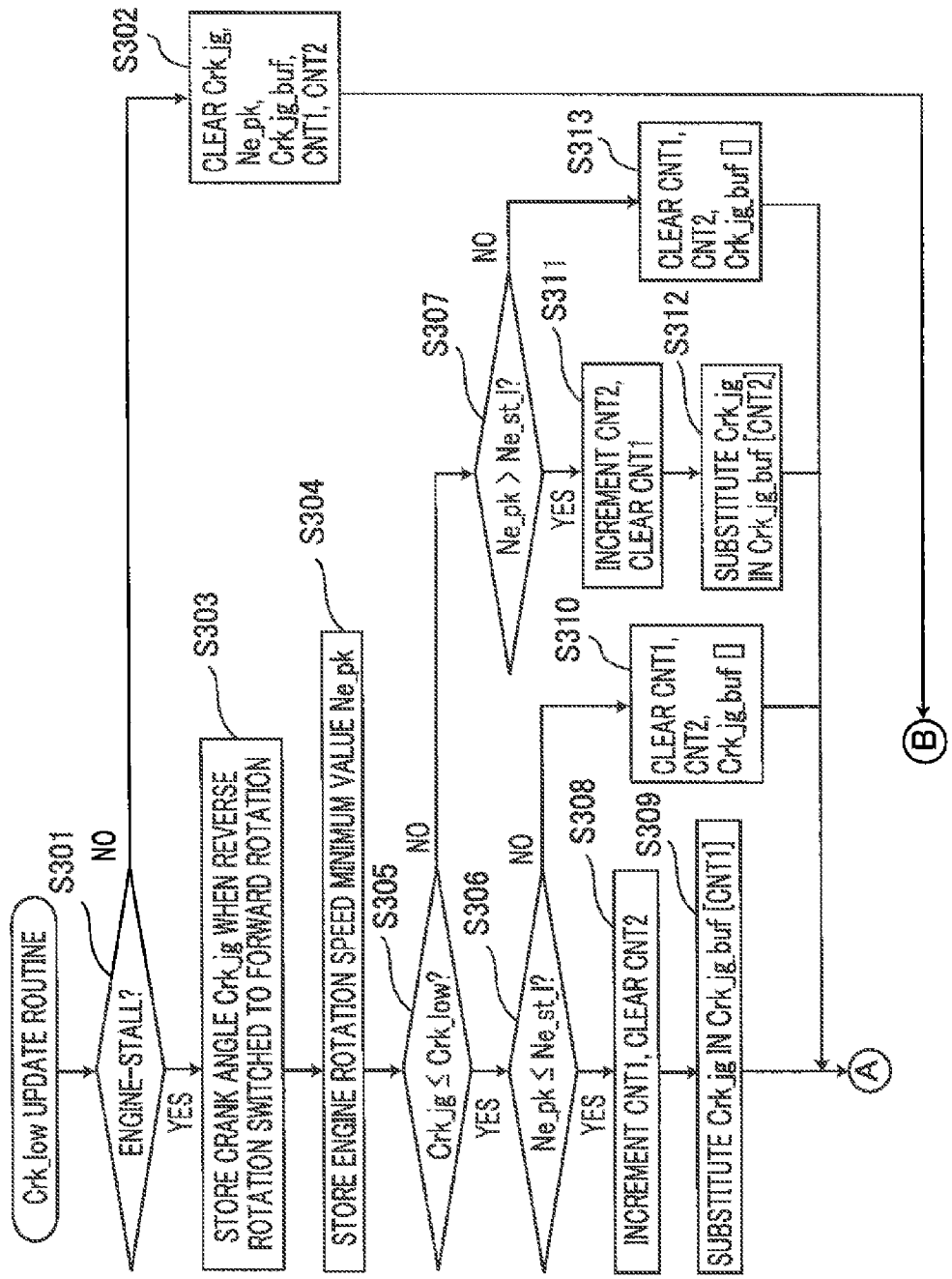
FIG. 11A and FIG. 11B are a flowchart of an updating routine of a determination value Crk_low in a determination routine for starter activation prohibition.
Figure 11B:
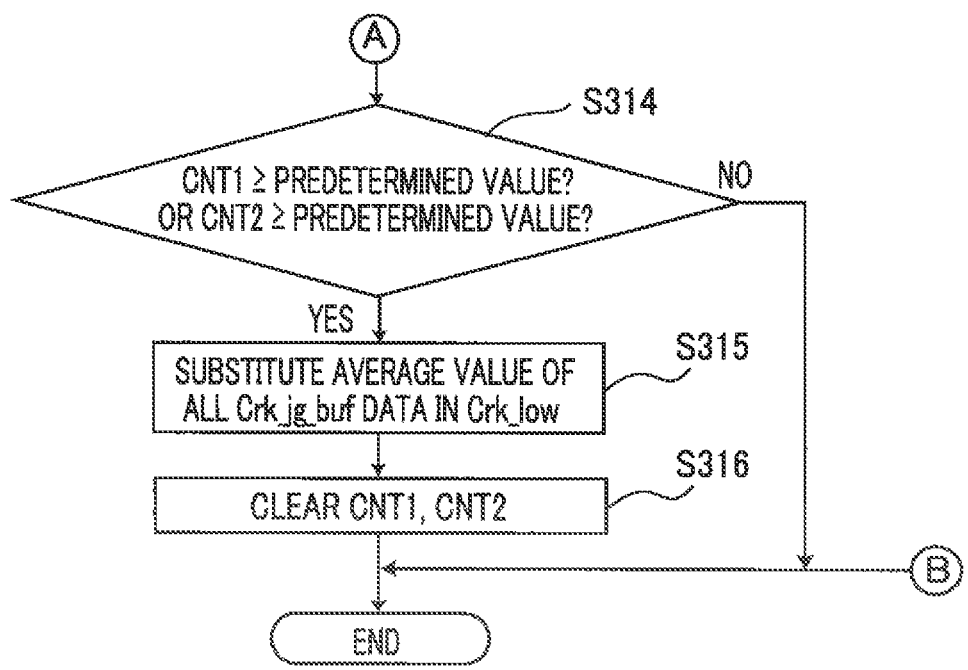

FIG. 10 shows time-series responses of descending behavior of the engine rotation speed, the crank angle, and the forward and reverse rotation determination flag F4. This example shows crank angles at which forward rotation is switched to reverse rotation taking the same value in both cases of the reverse rotation being deep (solid line) and shallow (dashed line).

In the solid-line case in which the reverse rotation is deep, since the reverse rotation peak value Ne_pk1 is smaller than the lower limit Ne_st_l of the rotation speed allowing starter shift, starter activation must be prohibited. Whereas in the dashed-line case in which the reverse rotation is shallow, since the reverse rotation peak value Ne_pk2 is greater than the lower limit Ne_st_l of the rotation speed allowing the starter shift, the starter activation may be permitted.

An engine-stall flag is a flag that is set when the engine is determined to have stopped, which is set at time t_94 when the reverse rotation is shallow (dashed line) and at time t_95 when the rotation is deep (solid line). The flag is actually set, using a signal from the crank angle sensor 1, when a predetermined time of, for example, 200 ms elapses after the last pulse has been detected.

Figure 4A:
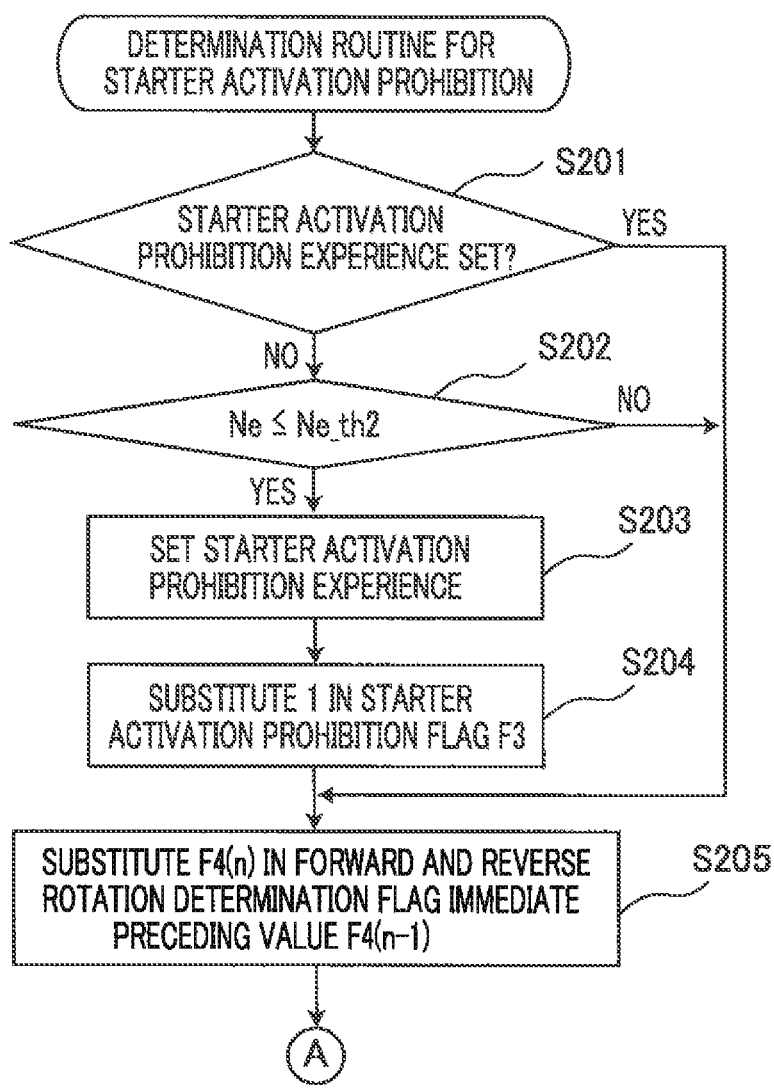
FIG. 4A and FIG. 4B are a flowchart of a determination of prohibiting starter activation in the device for automatically stopping and restarting an internal combustion engine according to Embodiment 1 of the present invention.
Figure 4B:
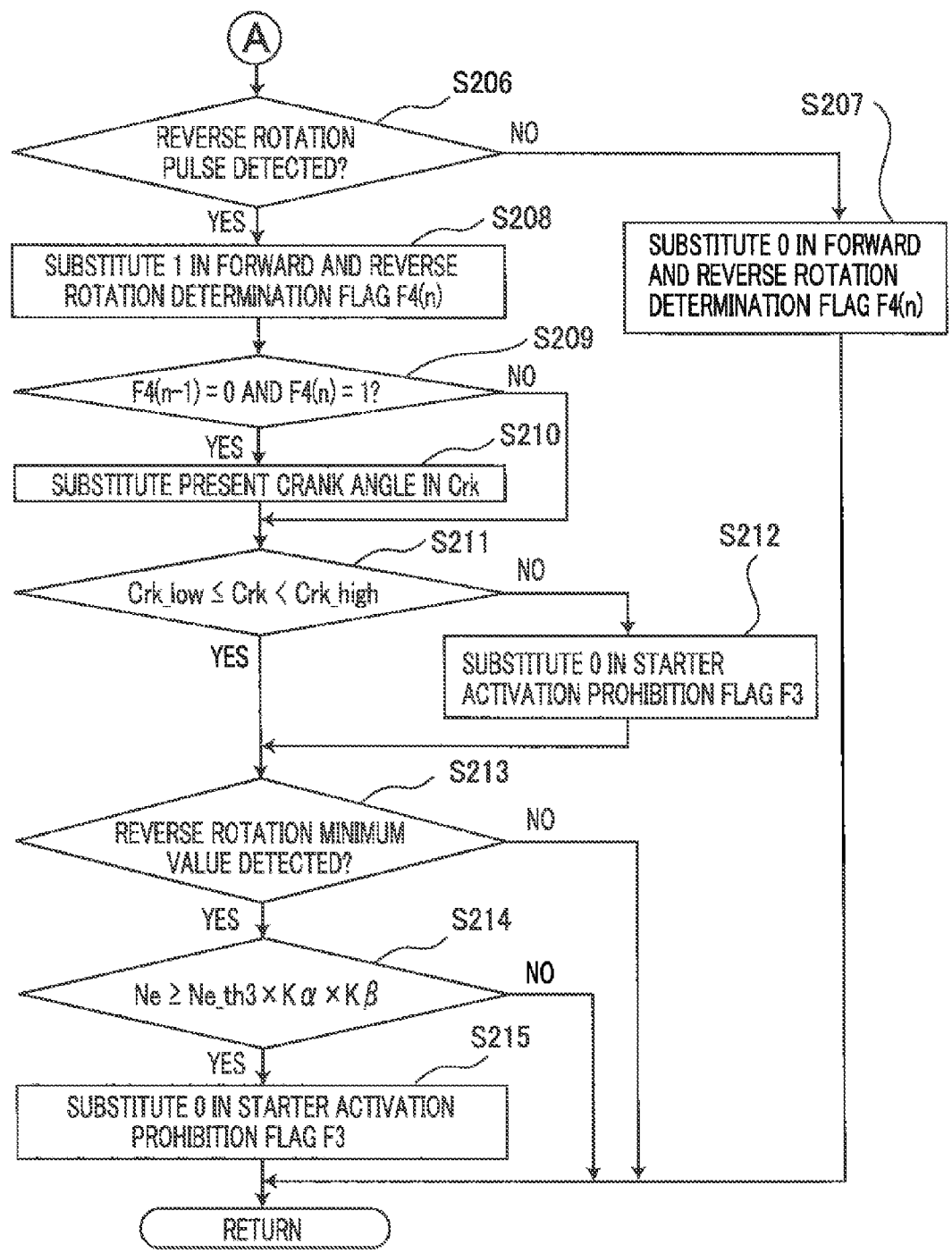

If Crk_low used for the determination routine for starter activation prohibition in FIG. 4A and FIG. 4B is −70° (70° BTDC), the starter activation would be prohibited in the case of the response indicated by the dashed line in which the reverse rotation is shallow, so that starting the start-up would be delayed, thereby extending start-up time. Therefore, if Crk_low is updated to −50° (50° BTDC) in this case, the start-up time at the next restart request can be shortened.

Logic for updating the determination value Crk_low used for determination of clearing the starter activation prohibition flag F3 will be explained using the flowchart in FIG. 11A and FIG. 11B. This control routine is executed every time when idling stop is performed.

In Step S301, a determination is made as to whether or not the engine is in an engine-stall state. When the engine is not in the engine-stall state, the process goes to NO, Step S302 is executed, and each of the data used for the determination is cleared.

Whereas, when the engine is in the engine-stall state, the process goes to YES and Step S303 is executed.

In Step S303, the crank angle when forward rotation is switched to reverse rotation is stored in Crk_jg. Crk detected in the process of Step S210 of the flowchart in FIG. 4A and FIG. 4B is substituted in Crk_jg. Next, the minimum value Ne_pk of the engine rotation speed Ne is stored in Step S304. As to the minimum value of the engine rotation speed Ne, the engine rotation speed used for the determination in Step S213 in FIG. 4A and FIG. 4B is substituted in Ne_pk.

Next, Crk_jg is compared with. Crk_low in Step S305. When Crk_jg is smaller than Crk_low, the process goes to YES and Step S306 is executed.

Whereas, when Crk_g is greater than Crk_low, the process goes to NO and Step S307 is executed.

In Step S306, the minimum value Ne_pk of the engine rotation speed is compared with the lower limit rotation speed Ne_st_l allowing the starter shift. When Ne_pk is smaller than Ne_st_l, the process goes to YES and Step S308 is executed. Whereas, when Ne_pk is greater than Ne_st_l, the process goes to NO and Step S310 is executed.

In Step S308, the counter 1 (CNT 1) is incremented and the counter 2 (CNT 2) is cleared, and Step S309 ensues. Then, Crk_jg is substituted in Crk_jg_buf in Step S309 and Step S314 ensues.

Here, Crk_jg_buf is array data and has storage areas in accordance with values of the counter 1 and counter 2.

The counter 1 (CNT 1), the counter 2 (CNT 2) and Crk_jg_buf are cleared in Step S310 and Step S314 ensues.

In Step S307, the minimum value Ne_pk of the engine rotation speed is compared with the lower limit rotation speed Ne_st_l the starter shift. When Ne_pk is higher than Ne_st_l, the process goes to YES and Step S311 is executed. Whereas, when Ne_pk is lower than Ne_st_l, the process goes to NO and Step S313 is executed.

In Step S311, the counter 2 (CNT 2) is incremented and the counter 1 (CNT 1) is cleared, and Step S312 ensues. Then in Step S312, Crk_jg is substituted in Crk_jg_buf and Step S314 ensues.

The counter 1 (CNT 1), the counter 2 (CNT 2) and Crk_jg_buf are cleared in Step S313 and Step S314 ensues.

A determination of the counters is made in Step S314. When the counter 1 is greater than a predetermined value or the counter 2 is greater than another predetermined value, Step S315 ensues and the average value of Crk_jg_buf is substituted in Crk_low. Then, the counter 1 and counter 2 are cleared in Step S316, and the routine for updating Crk_low is completed. Whereas, when the counter 1 is smaller than the predetermined value and the counter 2 is smaller than the other predetermined value, the process goes to NO and the routine for updating Crk_low is completed.

Here, the predetermined values used for the determination of each counter are preferably set to a value between some 3 to 5.

As described above, since the automatic engine stopping and restarting device according to Embodiment 2 of the present invention is made to correct the crank angle to remove the starter activation prohibition by reverse, rotation behavior when the engine stopping, an optimum removal of the starter activation prohibition becomes possible at all times, even if the descending behavior of the engine rotation speed varies attributed to difference in individual vehicles and changes over time of vehicles.

Therefore, time spent from a restart request to start-up completion can be maintained at all times at a minimum amount of time even if the stopping characteristics of the engine rotation speed change depending on vehicles, so that discomfort will not be caused to drivers.

Moreover, since the crank angle to make the determination of removing the starter activation prohibition is updated after the determination of engine-stall by automatic stop, a determination as to whether or not to update the data can be made in a state of the engine completely stopping, so that data in the course of the engine stopping will not be erroneously used for the determination.

Therefore, risk of erroneously updating can be avoided.

Furthermore, the crank angle to make the determination of removing the starter activation prohibition is updated when updating conditions are met multiple times; therefore, risk of erroneously updating due to false detection of the engine rotation speed and crank angle caused by noise can be avoided.

INDUSTRIAL APPLICABILITY

The present invention preferably provides a device for automatically stopping and restarting an internal combustion engine that stops an engine when automatically stopping conditions are met and following that, restarts the engine when restarting conditions are met

DESCRIPTION OF THE REFERENCE NUMERALS

1: crank angle sensor
2: vehicle speed sensor
3: accelerator-opening sensor
4: brake pedal signal
5: battery voltage sensor
10: engine
11: fuel injection unit
12: ring gear
20: starter
21: solenoid
22: plunger
23: lever
24: starter motor
25: pinion gear
50: engine control unit (ECU)
101: engine automatic-stop and control routine
102: determination routine for starter activation prohibition

The invention claimed is:

1. A device for automatically stopping and restarting an internal combustion engine including
a fuel injection unit that injects fuel into an engine;
a crank angle sensor that detects a crank angle of the engine and outputs a crank angle signal;
a starter having a pinion gear that engages with a ring gear of the engine at start-up and transmits rotation to the ring gear; and
an engine control unit configured to control the fuel injection unit and the starter; wherein
the engine is automatically stopped when automatically stopping conditions are met and following that, the engine is restarted when restarting conditions are met;
wherein the engine control unit is further configured to make a determination of engine reverse rotation during inertial rotation of the engine, thereby prohibiting activation of the starter, and removes the starter activation prohibition depending on the crank angle when the engine starts reverse rotation;
wherein the engine control unit is further configured to detect a minimum rotation speed during the engine reverse rotation, and removes the starter activation prohibition at a timing of engine rotation speed becoming a predetermined tolerable rotation speed after the detection of the minimum rotation speed during the engine reverse rotation; and wherein the predetermined tolerable rotation speed is obtained from a factor deciding a contacting time for the pinion gear to contact the ring gear after the activation of the starter is started.

2. The device for automatically stopping and restarting the internal combustion engine according to claim 1, wherein the engine control unit is further configured to, when detecting a calculation value of the engine rotation speed increasing compared with the immediately preceding value, make the immediately preceding value of the engine rotation speed the minimum value during the engine reverse rotation.

3. The device for automatically stopping and restarting the internal combustion engine according to claim 1, wherein the factor deciding the contacting time is a gap between the pinion gear and the ring gear or battery voltage.

4. The device for automatically stopping and restarting the internal combustion engine according to claim 1, wherein the crank angle sensor is a sensor capable of detecting the engine reverse rotation.

5. The device for automatically stopping and restarting the internal combustion engine according to claim 2, wherein the crank angle sensor is a sensor capable of detecting the engine reverse rotation.

6. A device for automatically stopping and restarting the internal combustion engine including
 a fuel injection unit that injects fuel into an engine;
 a crank angle sensor that detects a crank angle of the engine and outputs a crank angle signal;
 a starter having a pinion gear that engages with a ring gear of the engine at start-up and transmits rotation to the ring gear; and
 an engine control unit configured to control the fuel injection unit and the starter; wherein
 the engine is automatically stopped when automatically stopping conditions are met and following that, the engine is restarted when restarting conditions are met;
 wherein the engine control unit is further configured to make a determination of engine reverse rotation during inertial rotation of the engine, thereby prohibiting activation of the starter, and removes the starter activation prohibition depending on the crank angle when the engine starts reverse rotation, wherein
 the crank angle sensor detects the crank angle when the engine starts reverse rotation,
 the engine control unit is further configured to detect a minimum rotation speed during the engine reverse rotation, and if
 the crank angle when the engine starts reverse rotation is smaller than a crank angle threshold value to make a determination of removing the starter activation prohibition, and the minimum value of the engine rotation speed during the engine reverse rotation is smaller than a lower limit of a range allowing starter shift, or
 the crank angle when the engine starts reverse rotation is greater than the crank angle threshold value to make the determination of removing the starter activation prohibition, and the minimum value of the engine rotation speed during the engine reverse rotation is greater than the lower limit of the range allowing the starter shift,
 the crank angle threshold value to make the determination of removing the starter activation prohibition is updated to the presently-detected crank angle when the engine starts reverse rotation.

7. The device for automatically stopping and restarting the internal combustion engine according to claim 6, wherein the crank angle to make the determination of removing the starter activation prohibition is updated after a determination of engine-stall by automatic stop.

8. The device for automatically stopping and restarting the internal combustion engine according to claim 6, wherein the crank angle to make the determination of removing the starter activation prohibition is updated when updating conditions are met multiple times.

9. The device for automatically stopping and restarting the internal combustion engine according to claim 7, wherein the crank angle to make the determination of removing the starter activation prohibition is updated when updating conditions are met multiple times.

* * * * *